United States Patent
Dixon et al.

(10) Patent No.: US 7,378,973 B2
(45) Date of Patent: *May 27, 2008

(54) RFID TAGS HAVING IMPROVED READ RANGE

(75) Inventors: Paul F. Dixon, Wakefield, MA (US); Michael P. Carpenter, Acton, MA (US); Mary M. Osward, Holbrook, MA (US); David A. Gibbs, Waban, MA (US)

(73) Assignee: Emerson & Cuming Microwave Products, Inc., Randolph, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/390,012

(22) Filed: Mar. 27, 2006

(65) Prior Publication Data

US 2006/0220866 A1 Oct. 5, 2006

Related U.S. Application Data

(60) Provisional application No. 60/665,990, filed on Mar. 29, 2005.

(51) Int. Cl.
G08B 13/14 (2006.01)

(52) U.S. Cl. .................... 340/572.8; 235/492; 428/615

(58) Field of Classification Search ............. 340/572.1, 340/572.8; 428/615, 620, 621; 235/492
See application file for complete search history.

(56) References Cited

U.S. PATENT DOCUMENTS

| 5,241,299 | A | * | 8/1993 | Appalucci et al. | ........ 340/572.3 |
| 5,912,622 | A | * | 6/1999 | Endo et al. | ............. 340/572.5 |
| 7,064,668 | B2 | | 6/2006 | Porad | ..................... 340/572.1 |
| 2005/0083203 | A1 | * | 4/2005 | Surkau | .................... 340/572.7 |
| 2006/0109124 | A1 | * | 5/2006 | Dixon et al. | ............ 340/572.1 |

FOREIGN PATENT DOCUMENTS

DE 10204884 A1 * 8/2003

* cited by examiner

Primary Examiner—Thomas Mullen
(74) Attorney, Agent, or Firm—Nields & Lemack (57) ABSTRACT

The present invention provides a system and method for optimizing the performance of 13.56 MHz frequency RFID tags in conjunction with metal substrates. Briefly, a thickness exists for each type of RFID isolator material at which the performance of a 13.56 MHz RFID tag is optimal when used with metal. Varying from this optimal value, in either the positive or negative direction adversely affects read distance. A method of determining this optimal thickness is disclosed, as well as an RFID tag or a substrate being used in conjunction with a material of this thickness.

28 Claims, 13 Drawing Sheets

13.56 MHz READ RANGE, EXAMPLE D

RFID TAGS HAVING IMPROVED READ RANGE

This application claims priority of U.S. Provisional Application Ser. No. 60/665,990, filed Mar. 29, 2005, the disclosure of which is incorporated herein by reference.

BACKGROUND OF THE INVENTION

Radio Frequency Identifier (RFID) tags are used in a variety of applications, such as inventory control and security. The advantage of these more intelligent RFID systems is that, unlike barcode tracking systems, an RFID system can store specific information about an article and can read that information on a tag without requiring line of sight or a particular orientation. This means that RFID systems can be largely automated, reducing the need for manual scanning.

These RFID tags are typically placed on or in articles or containers such as cardboard boxes. The RFID tags work in conjunction with an RFID base station. The base station supplies an electromagnetic wave output, which acts as the carrier frequency. Data are then used to modulate the carrier frequency to transmit specific information. RFID systems typically operate at either a low frequency range (generally less than 100 MHz), or a higher frequency range (greater than 100 MHz). In many applications, one such higher frequency range is between 800 and 1000 MHz, with 915 MHz being the most common high frequency currently utilized in the United States. Most RFID systems utilize frequency hopping centered around this frequency, such that the overall frequency range is approximately 902 to 928 MHz. A second high frequency used by RFID tags in the United States is 2450 MHz. Currently, European standards utilize 869 MHz and the Japanese standard is 953 MHz.

Many RFID tags contain integrated circuits, which are capable of storing information. Depending on the specific implementation of the RFID tag, the integrated circuit may be capable of replacing stored information with new information at a later time. When the base station requests data, the integrated circuit supplies the information that it has stored. In those RFID tags that permit information to be rewritten, the integrated circuit overwrites its existing information when new data are received from the base station.

In addition to the integrated circuit, the RFID tags include an antenna. This antenna is needed to receive the electromagnetic waves generated by the base station, and to transmit data via the same frequency. The configuration of the antenna can vary, and includes flat coils, patches, microstrip antennas, stripline antennas and dipoles.

Some of these RFID tags are self powered, that is, they contain an internal power supply such as a battery. Other RFID tags are field powered. These tags use incident RF energy transmitted by the base station to supply their required voltage. The RF energy is received by the tag antenna as an AC signal, which is then rectified to form a DC voltage, which is used to power the integrated circuit.

These integrated circuits have a minimum voltage requirement below which they cannot function and the tag cannot be read. The rectified DC voltage is a function of the signal strength of the received electromagnetic wave. For example, a RFID tag that is proximate to the base station will receive more energy and therefore be able to supply sufficient voltage to its integrated circuit, as contrasted to a RFID tag that is physically farther away from the base station. The maximum distance between the base station and the RFID tag at which the RFID tag can still be read is known as the read distance. In some applications, such as secure transactions, it may be preferable that the read distance be limited, such as less than 2 feet. These shorter read distances are typically achieved by using lower frequencies, preferably 13.56 MHz.

Passive RFID tag systems operating in the HF frequency band at 13.56 MHz employ magnetic induction to couple the transponder tag and the reader. The power required to energize and activate the tag microchip is drawn from the oscillatory magnetic field created by the reader. In free space, this magnetic field is undisturbed. However, if the RFID tag is placed on or in a metallic surface, the magnetic flux through the metal substrate induces eddy currents within the metal that oppose the reader's magnetic field. This damps the magnetic field in the metal to such a degree that communication between reader and transponder may no longer be possible. A similar issue of impaired readability exists with articles or products composed substantially of water or liquid.

Figure 1:
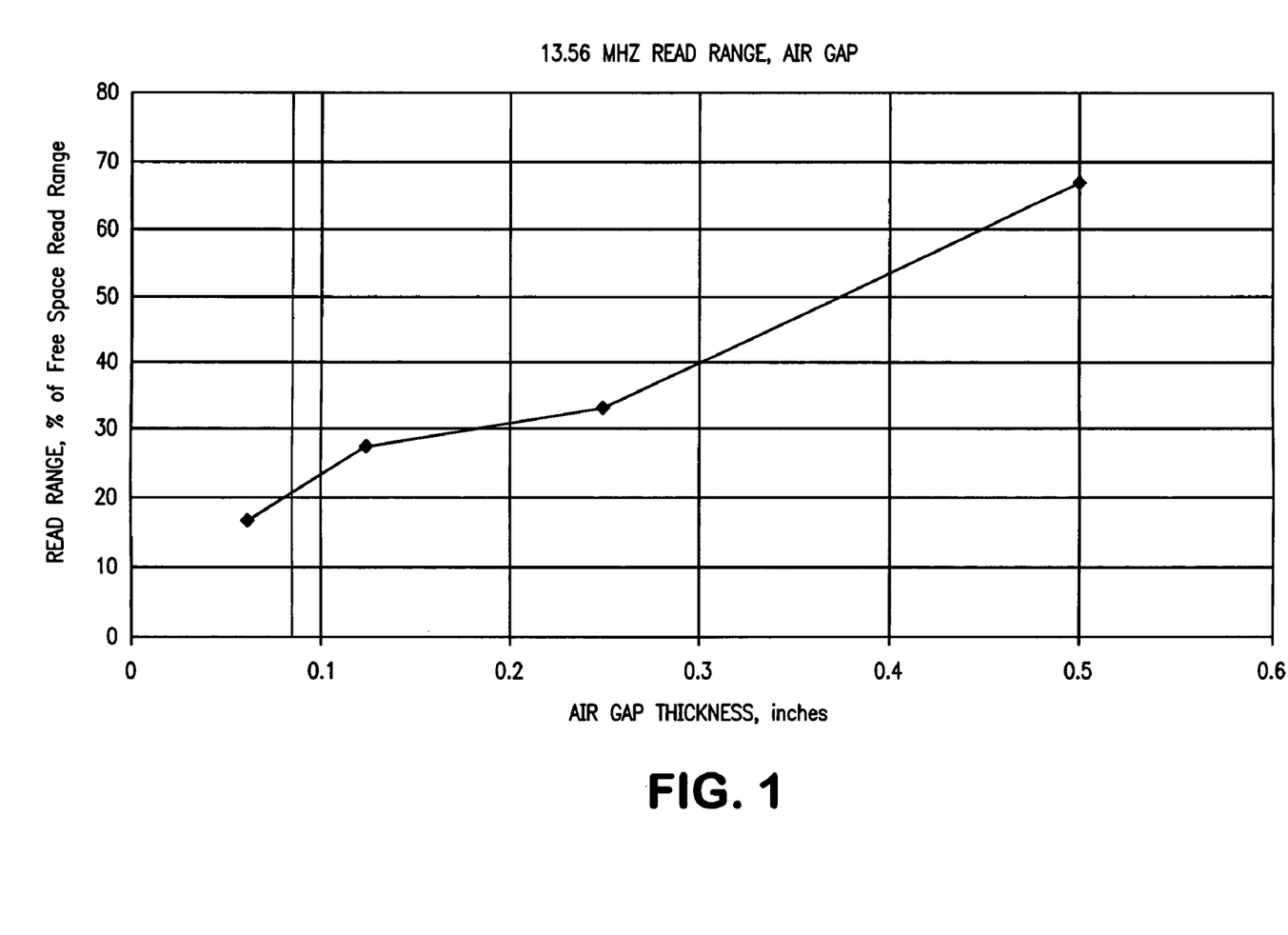
FIG. 1 illustrates a graphical representation of the read distance of an RFID tag in close proximity to a metal surface vs. air gap thickness.

Experimentation in the industry has shown that such RFID tags are once again readable if there is a substantial air gap interposed between the tag and the article substrate. This required air gap is typically at least one quarter of an inch or greater. FIG. 1 illustrates the relationship between the thickness of the air gap and the measured read range. This figure demonstrates that as the air gap is made larger, the read performance of the RFID tag continues to improve. Because of this well-known relationship between air gap and read performance, various designs have been developed to allow tags to "stand off" from the article substrate in order to create this gap. However, standoff tags are impractical in many commercial applications. The distance created between the tag and the article by the standoff increases the likelihood of the tag being dislodged or damaged in normal use.

Alternately, as noted in the RFID Handbook (Klaus Findenzeller, "RFID Handbook, Second Edition", John Wiley & sons (2003), p 109.), "by inserting highly permeable ferrite between the [tag antenna] coil and metal surface, it is possible to largely prevent the occurrence of eddy currents. This makes it possible to mount the antenna on [or within] metal surfaces".

Notwithstanding the reference in the RFID Handbook suggesting the use of highly permeable ferrite, there is little guidance concerning the selection of an appropriate material, nor insight as to a preferred or optimal thickness of the material that should be employed. Therefore, a system for effectively isolating a substrate from an RFID tag, as well as a method for optimizing the performance of RFID tags on the metal substrates would represent a significant advance for the use of 13.56 MHz frequency RFID tags.

SUMMARY OF THE INVENTION

The present invention provides a system for effectively isolating a substrate from an RFID tag and a method for optimizing the performance of 13.56 MHz frequency RFID tags in conjunction with metal substrates. Briefly, a thickness exists for each type of RFID isolator material at which the performance of a 13.56 MHz RFID tag is optimal when used with metal. Varying from this optimal value, in either the positive or negative direction adversely affects read distance. A method of determining this optimal thickness is disclosed, as well as an RFID tag being used in conjunction with a material of this thickness.

DETAILED DESCRIPTION OF THE INVENTION

As described above, an air gap between an RFID tag and a metal surface is traditionally used to improve the read distance of the tag. Larger air gaps (i.e. taller standoffs) are superior to narrower gaps. Because of the degradation of the read distance at close proximity to the metal substrate, standoffs are typically more than 0.25 inches thick. Based on FIG. 1, this represents a read distance of approximately 33% of the free space read distance. Increasing the standoff to 0.5 inches doubles the read distance of the RFID tag. However, a standoff of this height is susceptible to being damaged or being separated from the article. Thus, the designer is faced with a tradeoff between maximizing read distance by increasing the height of the standoff, and minimizing the susceptibility of the RFID tag to damage by reducing the height of the standoff.

Alternatively, the RFID Handbook suggests the use of highly permeable ferrite between the antenna coil and the metal substrate to largely prevent the occurrence of the eddy currents. This, in turn, improves the read distance of an RFID tag that is in close proximity to a metal substrate. The RFID handbook specifically and exclusively mentions ferrites. Other highly permeable ferromagnetic materials have also been found to be capable of preventing these eddy currents. A material possessing these characteristics effectively isolates the RFID tag from the metal surface, and herein will be referred to as an RFID isolator material. In addition to ferrite, other common ferromagnetic materials are iron, nickel, cobalt and their various alloys. All of these materials are typically available commercially as powders that can be blended with binder material. This blended material can then be formed into RFID isolators. The selection of the physical form and binder resin material for the isolator can vary according to the design of the particular RFID tag configuration and environment to which the tag system will be subjected.

Figure 12:
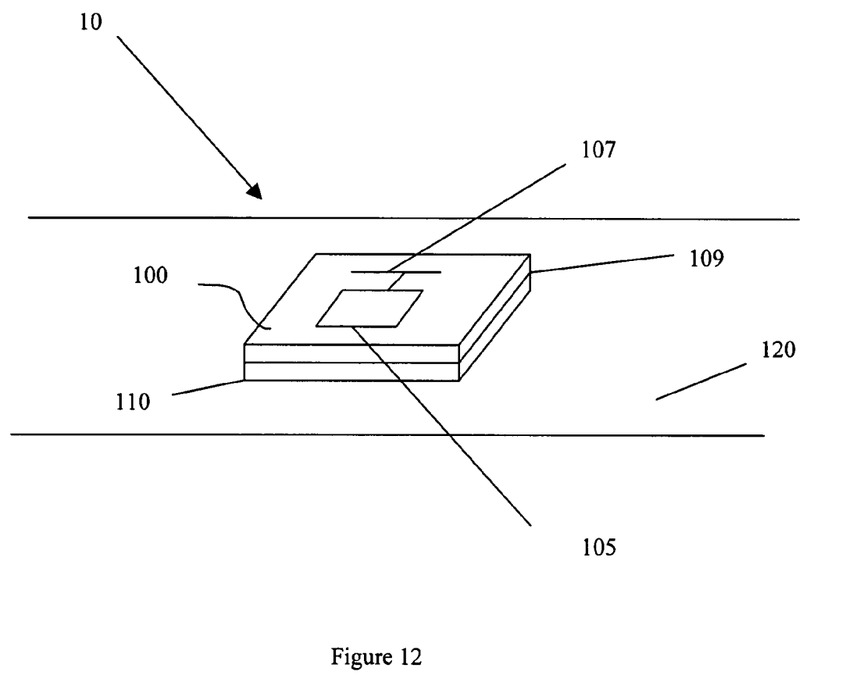
FIG. 12 shows a first embodiment of the present invention.

As shown in FIG. 12, one common form of RFID tag consists of an antenna 107 and silicon chip 105 intimately mounted on thin flexible plastic film substrate 109. In this case, a convenient form of RFID isolator is a thin flexible sheet 110 interposed between the tag substrate 109 and the metal surface 120 (or water containing article). In the preferred embodiment, the sheet of isolator material is cut into small sections, each of which corresponds to the size of an RFID tag antenna. One of these pre-cut sections 110 is then preferably attached to the bottom of an RFID tag 100, such as by adhesive. The opposite side of the sheet 110 (the side which is not adhered to the RFID tag) is preferably applied with a second adhesive, which is then used to affix the RFID tag to the metal substrate 120. Alternatively, the composite containing the ferromagnetic material can be applied directly onto the flexible plastic film substrate, such as by printing. Alternatively, the ferromagnetic sheet can be placed in the space defined between the tag or substrate and the article, in which other layers, such as metal or organic or decorative material, are also present.

As described above, little is known regarding the most effective use of these ferromagnetic materials in this application. Conventional wisdom suggests that, in much the same way that thicker air gaps perform better than thin ones, thicker sheets would perform better than thin sheets. Similarly, conventional wisdom suggests that more highly permeable materials would perform better than less permeable materials. Furthermore, the handbook only refers to the use of ferrites.

The shortcomings associated with the prior art, including the risk of damage when using large standoffs, are overcome through the use of very thin sheets of ferromagnetic materials. These sheets achieve optimal performance at dimensions far thinner than can be achieved using air gaps. Isolators of varying ferromagnetic material and permeability were prepared. This was done by blending ferromagnetic powder material with silicone elastomer prepolymer and curing agent, casting a sheet, and curing the cast sheet either at room temperature or elevated temperature, as appropriate to the formulation. Production of such "filled" silicone elastomers is well known in industry.

All tests were performed using a Tag-it™ ISO 15693 compatible RFID tag being interrogated with a RightTag, Inc Series 3000 RFID Hand Held Reader. Read distance measurements were first performed in the absence of a metal surface. This "free space" reading provides the basis for all subsequent tests. RFID tag read distance was determined by aiming the reader at the tag, some distance away from the tag, and then directly approaching the tag, noting the distance from the tag at which tag data could first be read by the Hand Held Reader. Repeated measurements found the read distance in. "free space" to be approximately 4 to 4.5 inches.

The RFID tag was then placed in intimate contact with a metal surface, and the tag was interrogated. As expected, the RFID tag was not readable. A battery of tests was then performed utilizing a variety of ferromagnetic materials, where sheets of various thicknesses were prepared for each material. Cured isolator sheet was placed on the underside of and in intimate contact with the RFID tag antenna. The tag/isolator laminate was then placed in contact with the metal surface and read distance was again determined. The ratio of read distance against a metal surface to the free space read distance was computed and expressed as a percentage of the free space read range.

Table 1 illustrates the various ferromagnetic materials, along with their permeability, that were tested. For each of these materials, isolator sheets of various thickness were prepared. Ferromagnetic isolator compositions were prepared by blending ferromagnetic materials in silicone elastomer at various concentrations to yield a range of permeability.

TABLE 1

| Example | Ferromagnetic Material in Composite Blend | Complex Isolator Relative Permeability @ 13.56 MHz |
|---|---|---|
| A | Nickel/Zinc Ferrite | 5.16-0.14i |
| B | Manganese/Zinc Ferrite | 10.51-0.48i |
| C | Carbonyl Iron | 4.46-0.13i |
| D | Carbonyl Iron | 7.90-0.01i |
| E | Carbonyl Iron + Magnetite | 7.73-0.10i |
| F | Iron Silicide | 4.02-0.76i |
| G | Iron/Nickel Alloy | 13.37-0.26i |

Figure 2:
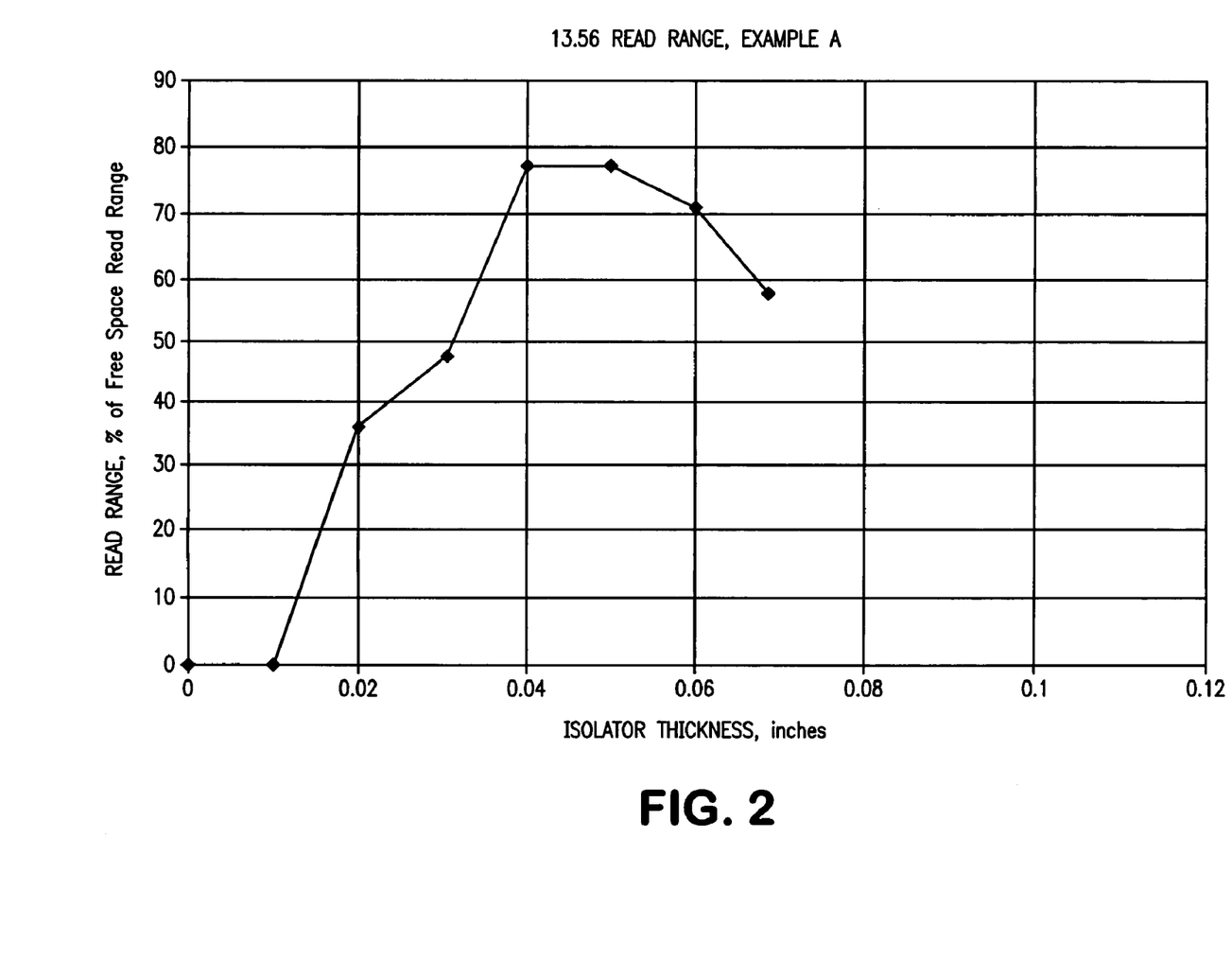
FIG. 2 illustrates a graphical representation of the read distance of an RFID tag in close proximity to a metal surface vs. material thickness for a composite containing Nickel/Zinc Ferrite.

The read distance of each sheet was determined in accordance with the procedure described above. The resulting read distance was then divided by the "free space" read distance to generate a read distance percentage. A value of 50% indicates that the RFID tag was first readable at half of the "free space" read distance. FIG. 2 shows a graphically representation of the read distance percentage as a function of isolator thickness for Nickel/Zinc Ferrite. As expected, the read distance increased as the isolator thickness was increased from 0.01 to 0.04 inches. However, unexpectedly, the read distance reached a plateau between 0.04 and 0.05 inches and the performance degraded as the isolator thickness was increased beyond 0.05 inches.

This result is in sharp contrast to the performance of the RFID tags used in conjunction with air gaps. Referring to FIG. 1, it was shown that read distance continued to improve as the air gap was enlarged. Because of this phenomenon, air gaps are typically greater than 0.25 inches. However, if one were to replace a 0.5-inch standoff used in conjunction with an RFID tag with a Nickel/Zinc Ferrite of the same thickness, the read distance would actually be degraded. For this reason, the use of ferromagnetic materials in conjunction with RFID tags for improving the read distance when used in close proximity to metal surfaces is not widely practiced today.

FIGS. 2 through 7 show the equivalent graphical representations for composites containing the other materials listed in Table 1. In all cases, it was found that there was an optimal isolator thickness and subsequent increases in that thickness resulting in degraded performance. Table 2 illustrates the optimal thickness for each tested material, arranged in ascending order of permeability. In addition to observing the optimal thickness of each material, the operating range of each material was calculated as well. The operating range is defined as the range of material thickness over which the read distance of the RFID tag was greater than 50% of its free space read distance.

TABLE 2

| Example | Permeability | Optimal Thickness, inches | Operating Range, inches |
|---|---|---|---|
| F | 4.02-0.76i | .05+ | >.04 |
| C | 4.46-0.13i | .062 | .06 |
| A | 5.16-0.14i | .045 | >.04 |
| D | 7.90-0.01i | .03 | .02 |
| E | 7.73-0.10i | .033 | .03 |
| B | 10.51-0.48i | .02 | .03 |
| G | 13.37-0.26i | .02 | .02 |

Table 2 indicates that generally as the permeability of a ferromagnetic material increases, the optimal thickness decreases. Similarly, the operating range generally decreases as the permeability increases. Thus, accurate determination of the optimum isolator thickness requires systematic evaluation of the read distance versus isolator layer thickness for each isolator composition. Because of the narrow range of isolator thickness over which significant beneficial effect is obtained for isolators of higher permeability, experiments with relatively large increments between test thicknesses can result in the conclusion that a particular isolator is ineffective. It may then be falsely concluded that relatively thin isolator layers fail to perform.

Figure 9:
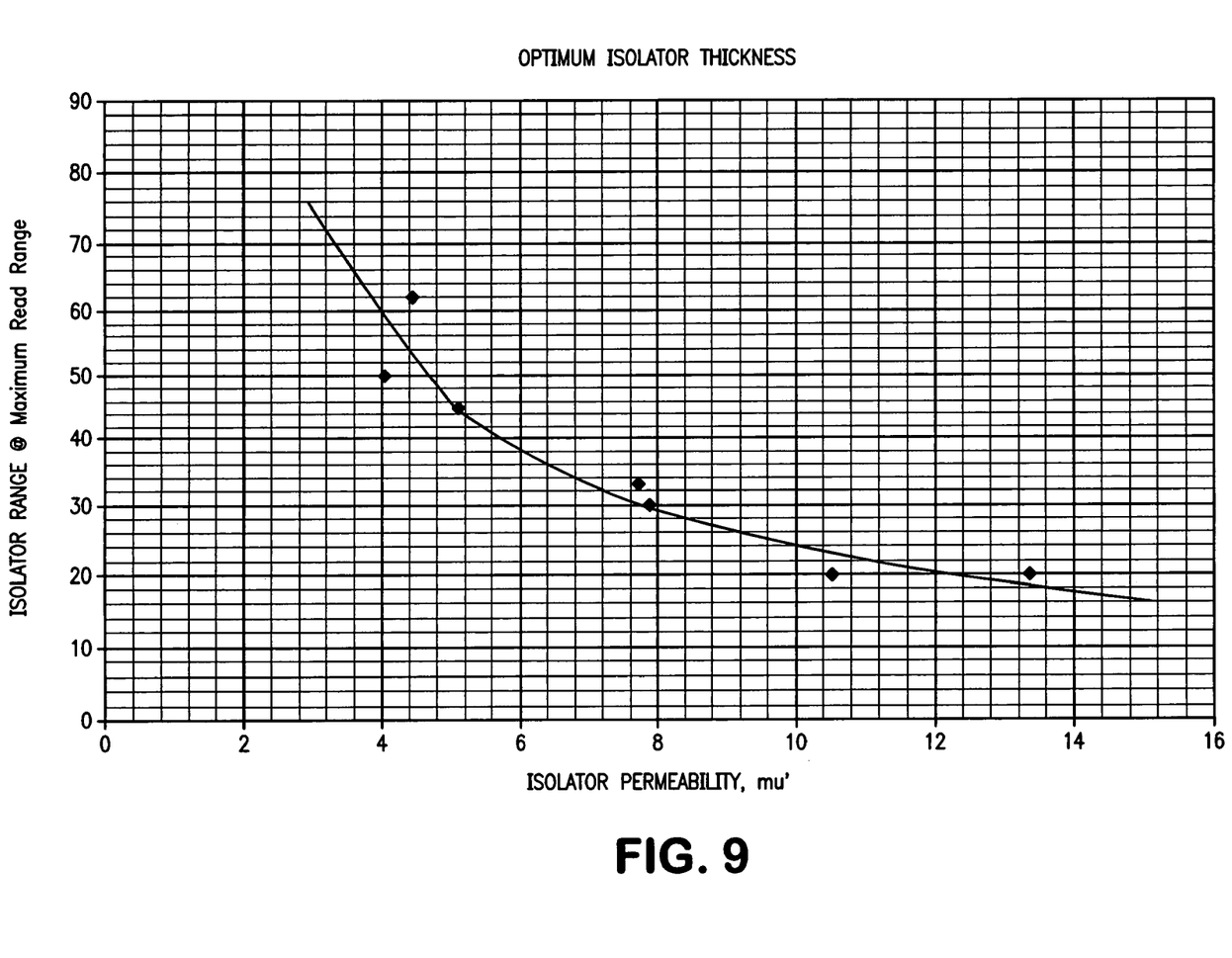
FIG. 9 illustrates a graphical representation of the optimal material thickness v. permeability for the materials represented in FIGS. 2 through 8 and a first equation incorporating these data points.

FIG. 9 illustrates the relationship between the optimal thickness of an isolator material and the corresponding permeability of that material. Based on this graph, it can be approximated that:

$$\ln(t_o) = 5.41 - 0.98 \ln(\mu') \quad (1)$$

where $t_o$ = optimum isolator thickness, in mils, and
$\mu'$ = real part of complex relative permeability The line shown in FIG. 9 illustrates this approximation. It should be noted that the predictive capability of this approximation decreases at lower relative permeability. However, the increased operating range associated with these materials makes the predictive capability of these materials less critical.

It is important to note in reference to FIG. 9 that the isolator thickness at which each of the ferromagnetic materials exhibited its optimal performance is far thinner than the dimensions typically used in conjunction with air gaps. Furthermore, the performance of these materials at the thicknesses commonly associated with air gaps (0.25-0.5 inches) shows no beneficial effects. However, at thickness less than 0.1 inches, these materials perform better than air gaps five times thicker.

Figure 10:
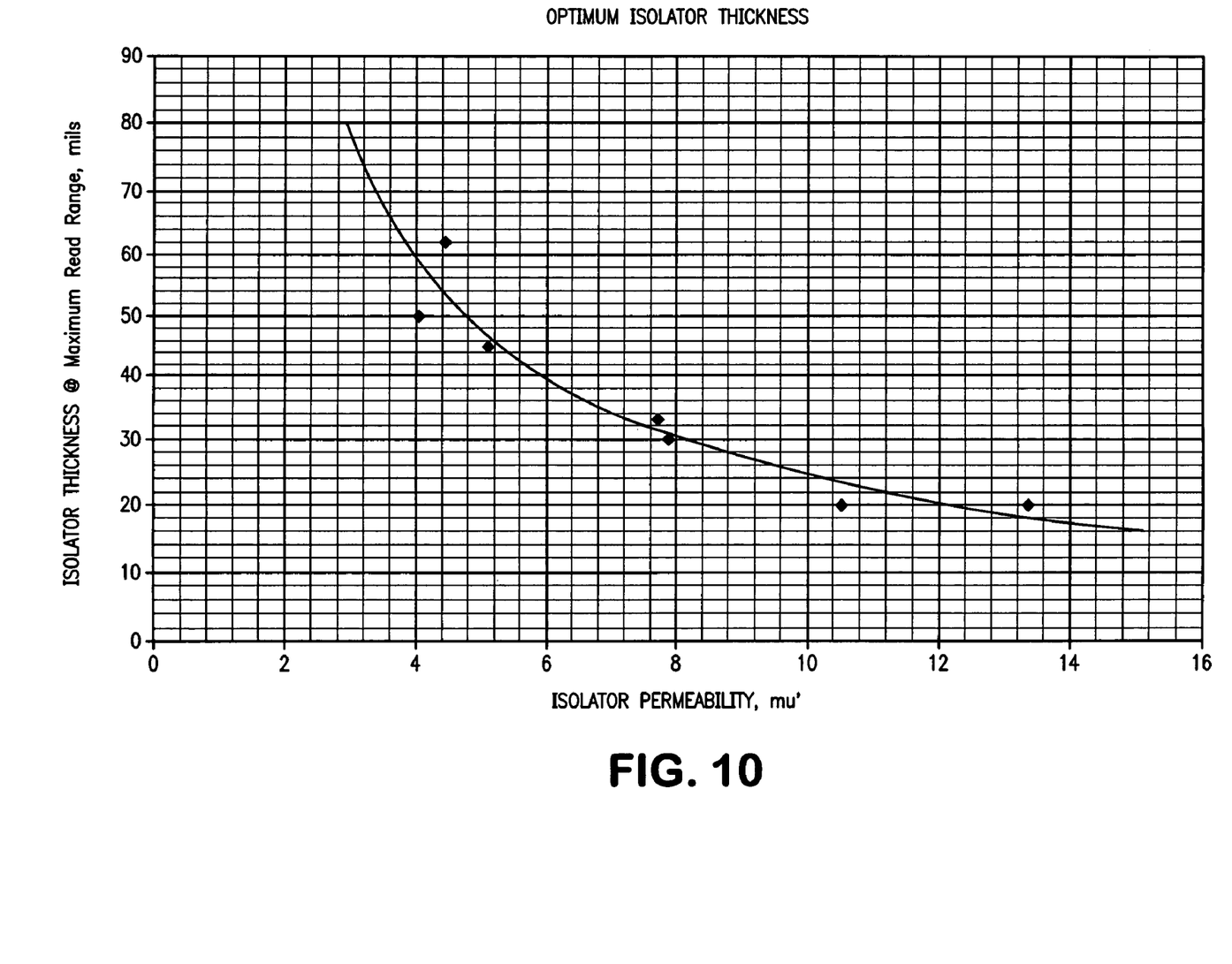
FIG. 10 illustrates a graphical representation of the optimal material thickness v. permeability for the materials represented in FIGS. 2 through 8 and a second equation incorporating these data points.
Figure 11:
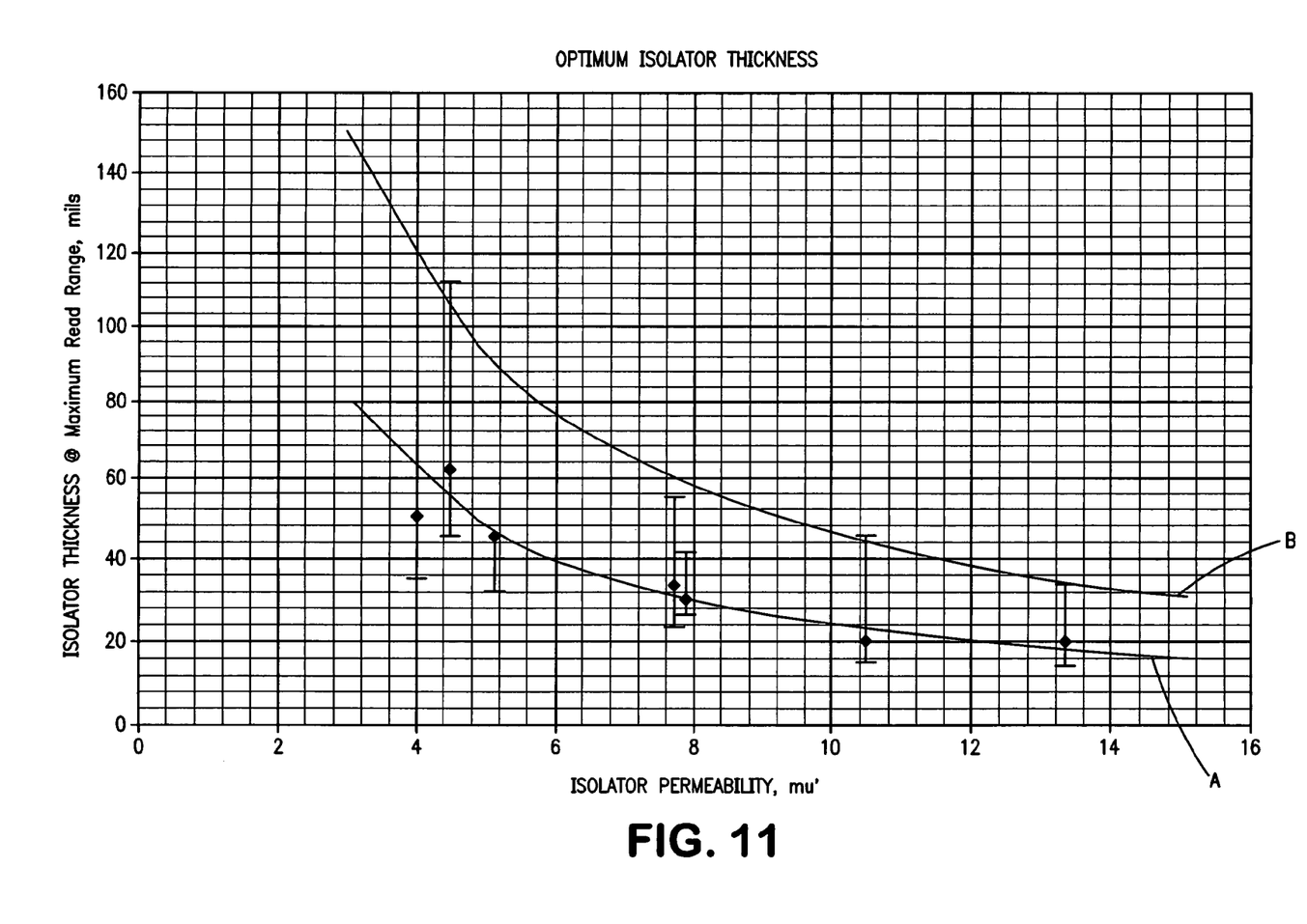
FIG. 11 illustrates a graphical representation of the material thickness/permeablility combinations that yield satisfactory read distances.

As a further approximation, the above equation (1) can be written as:

$$\mu'^* t_o = 240 \quad (2)$$

where $t_o$ = optimum isolator thickness, in mils, and
$\mu'$ = real part of complex relative permeability This approximation is shown in FIG. 10. This suggests that there is an inverse relationship between the optimal thickness of a material and its relative permeability. Thus, once the optimal thickness of a specific ferromagnetic material has been determined, the optimal thickness of a second ferromagnetic material can be estimated using the following equation:

$$t_1 = (\mu_o/\mu_1) * t_o \quad (3)$$

where $t_o$=optimal thickness of the first material,
$\mu_o$=real part of permeability of first material,
$t_1$=theoretical optimal thickness of second material,
$\mu_1$=real part of permeability of second material FIG. 11 illustrates the operating range as a function of isolator permeability. As described above, for each of the composites tested above, the optimal thickness, as well as the operating range of each material was determined. The operating range is defined as the range of material thickness over which the read distance of the RFID tag was greater than 50% of its free space read distance. This range is defined as:

$$t_{u50} - t_{l50},$$

where $t_{l50}$=the dimension at which the read distance first exceeds 50% of the free space read distance, and
$t_{u50}$=the dimension at which the read distance drops below 50%.

Figure 3:
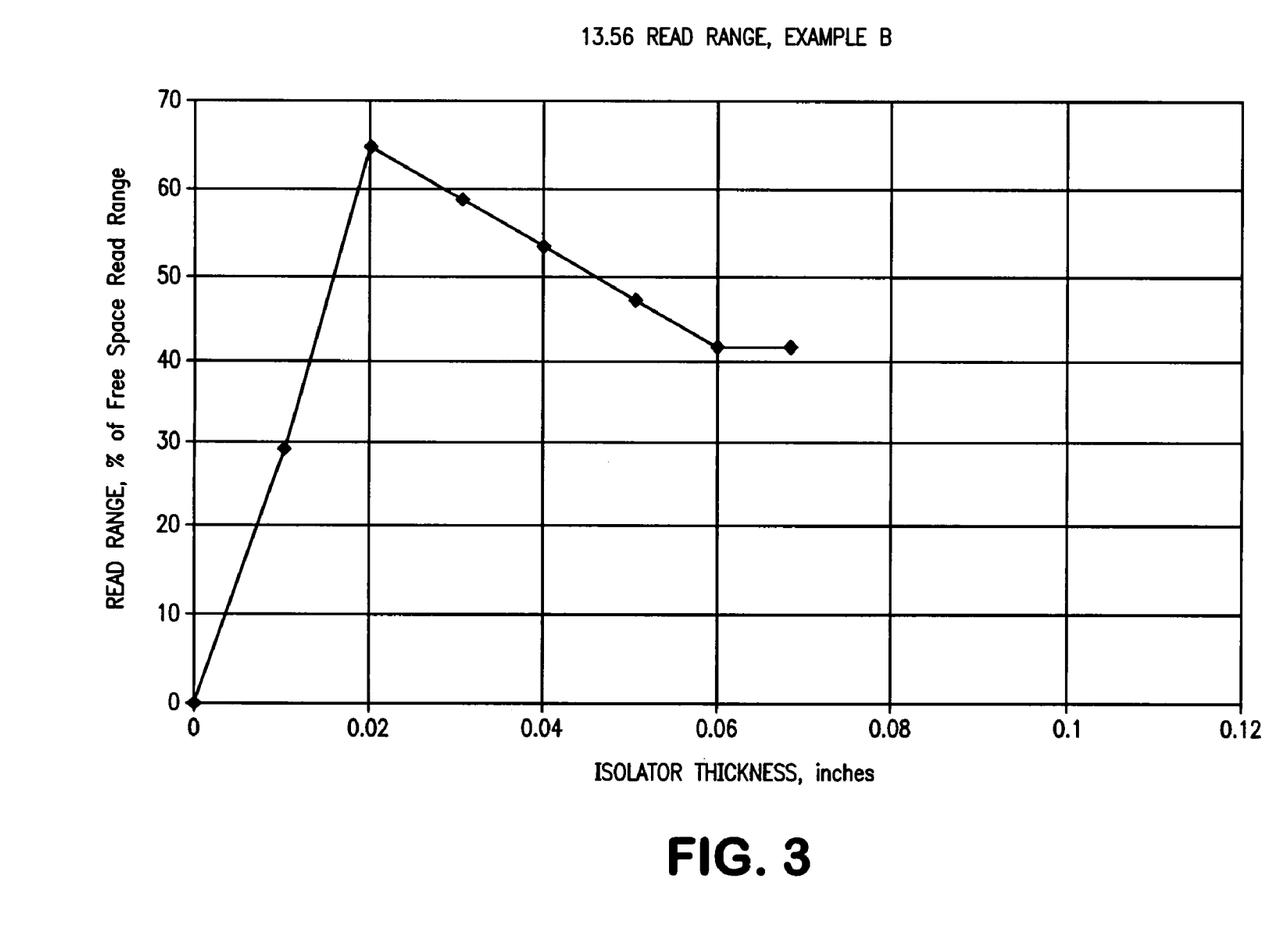
FIG. 3 illustrates a graphical representation of the read distance of an RFID tag in close proximity to a metal surface vs. material thickness for a composite containing Manganese/Zinc Ferrite.
Figure 4:
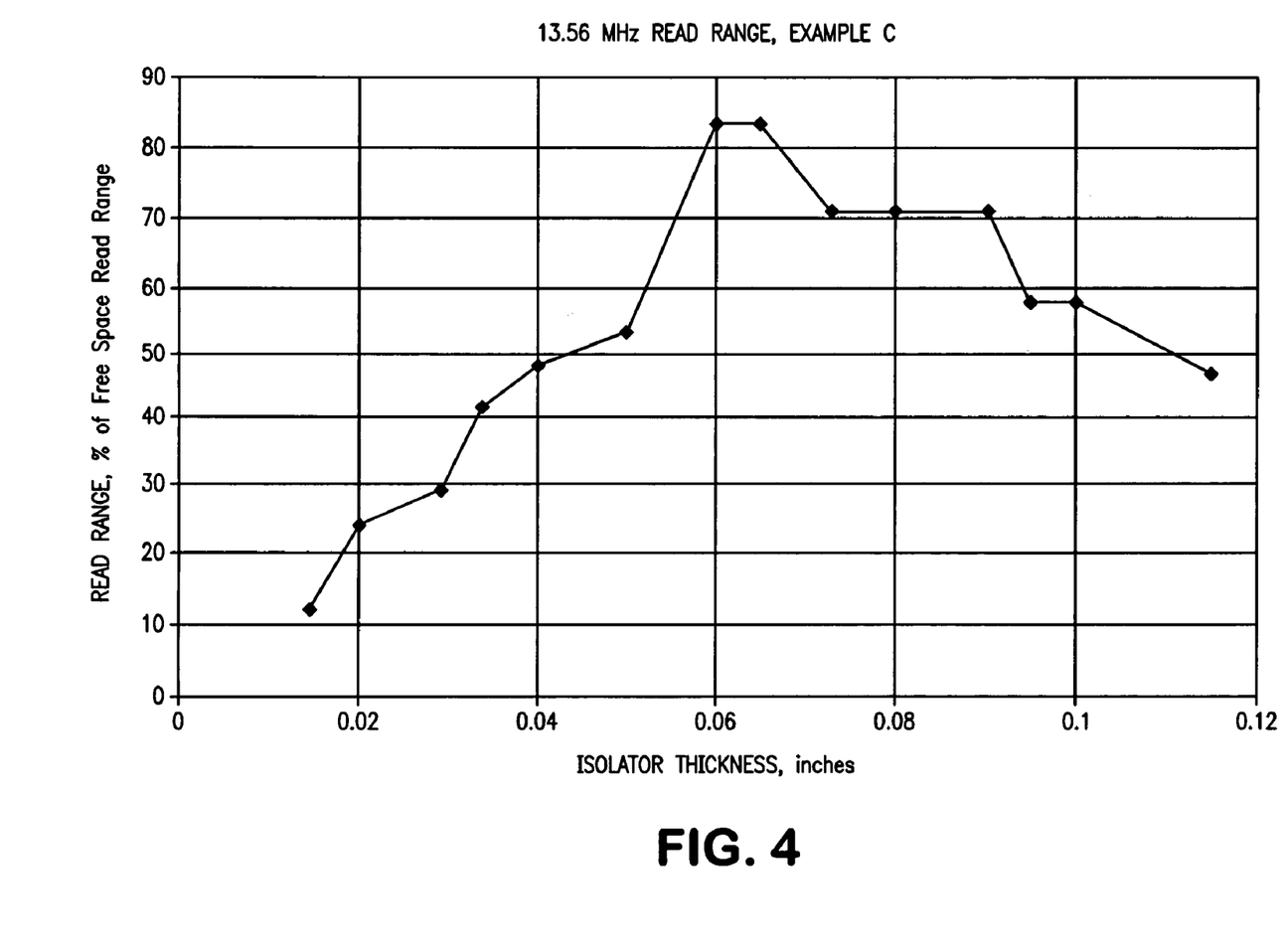
FIG. 4 illustrates a graphical representation of the read distance of an RFID tag in close proximity to a metal surface vs. material thickness for a composite containing Carbonyl Iron having a first permeability.
Figure 5:
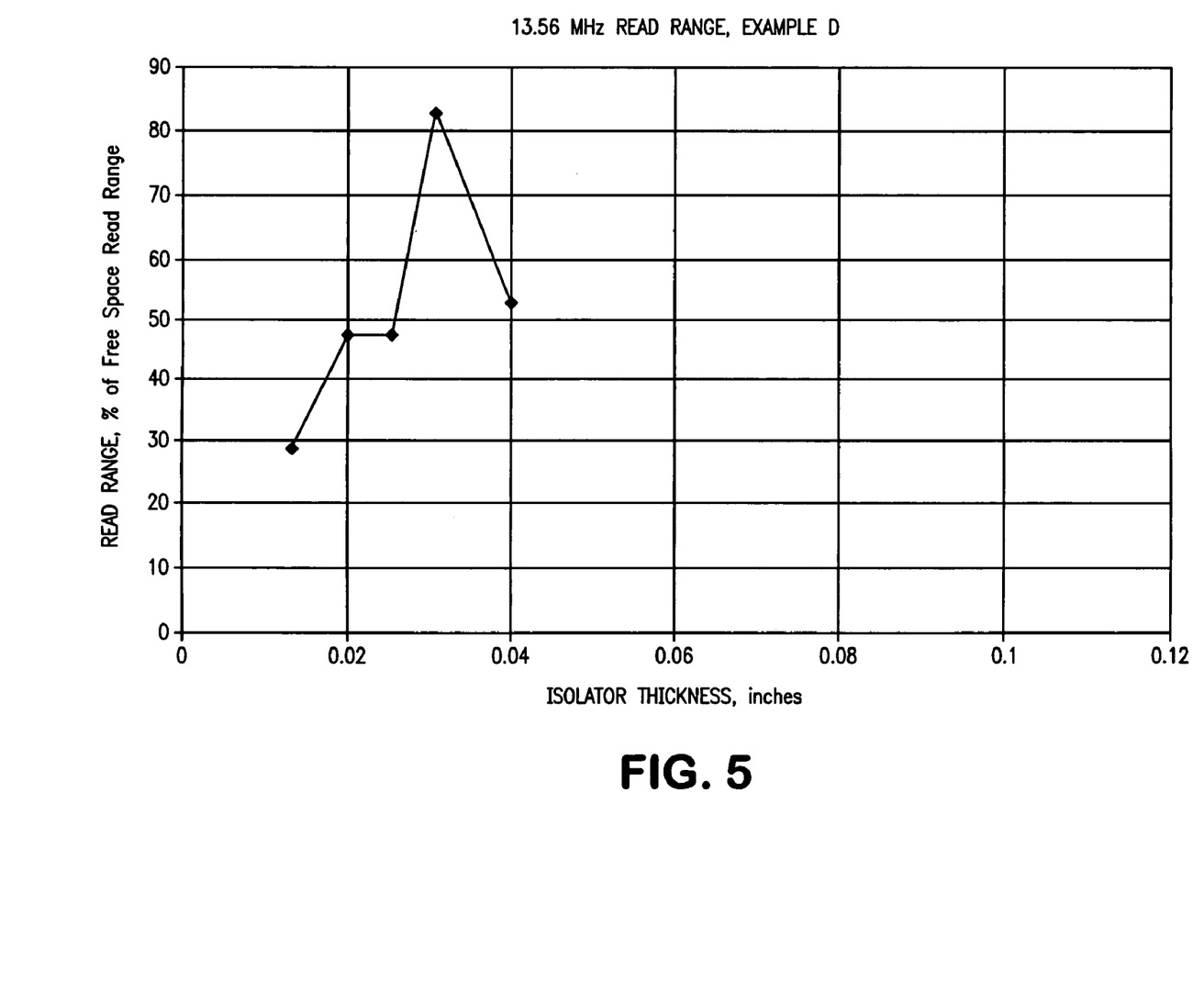
FIG. 5 illustrates a graphical representation of the read distance of an RFID tag in close proximity to a metal surface vs. material thickness for a composite containing Carbonyl Iron having a second permeability.
Figure 6:
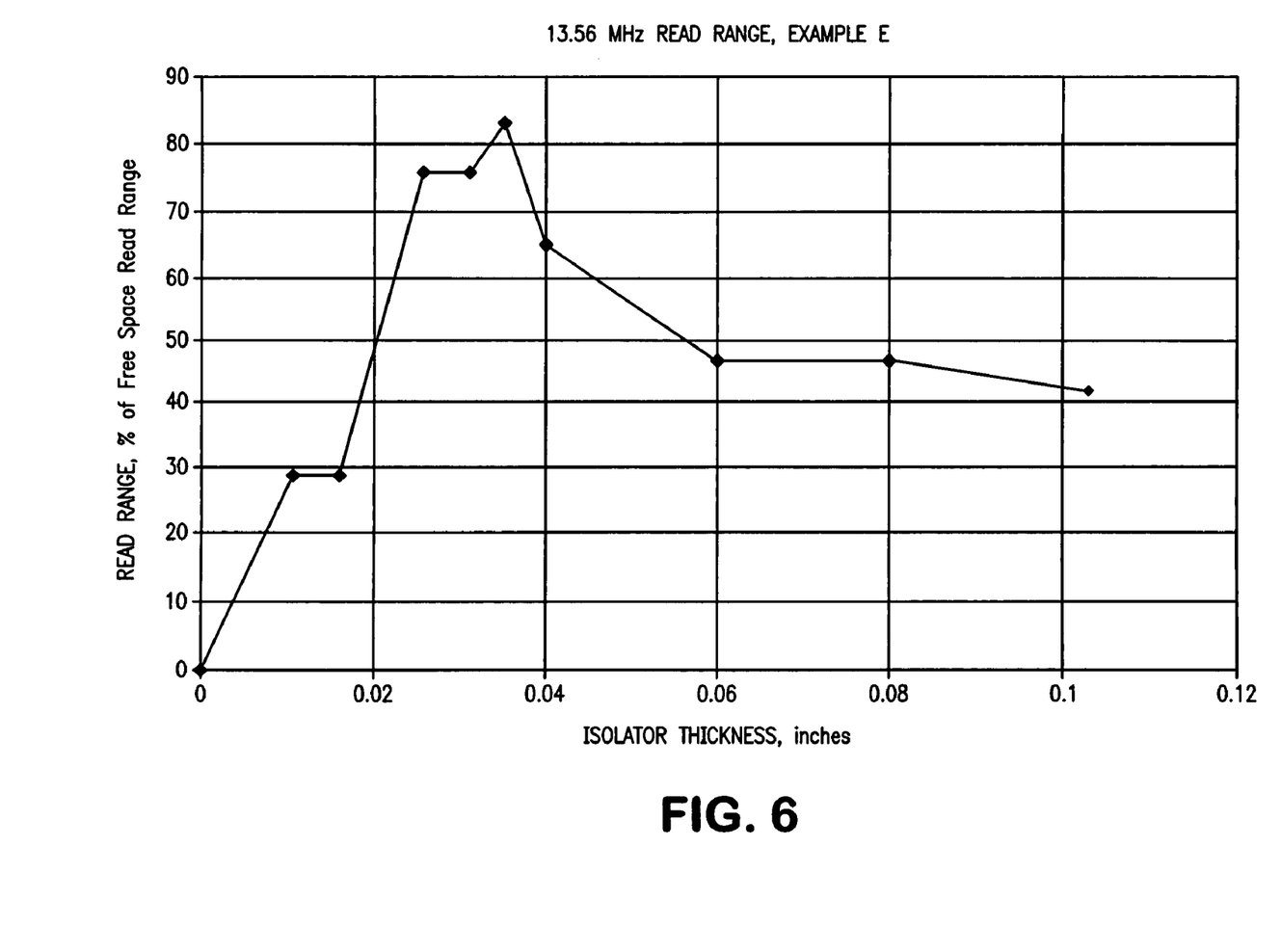
FIG. 6 illustrates a graphical representation of the read distance of an RFID tag in close proximity to a metal surface vs. material thickness for a composite containing Carbonyl Iron+Magnetite.
Figure 7:
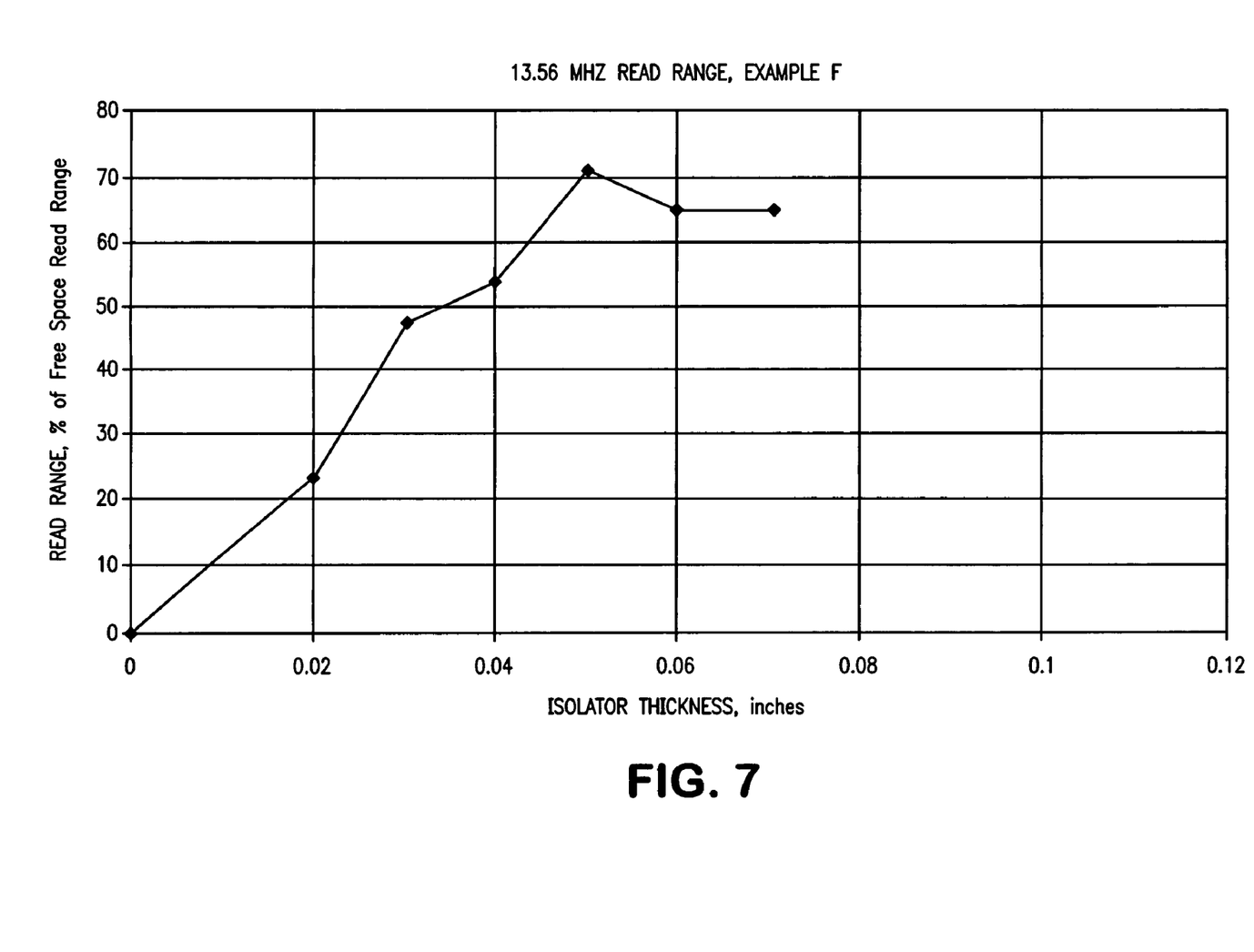
FIG. 7 illustrates a graphical representation of the read distance of an RFID tag in close proximity to a metal surface vs. material thickness for a composite containing Iron Silicide.
Figure 8:
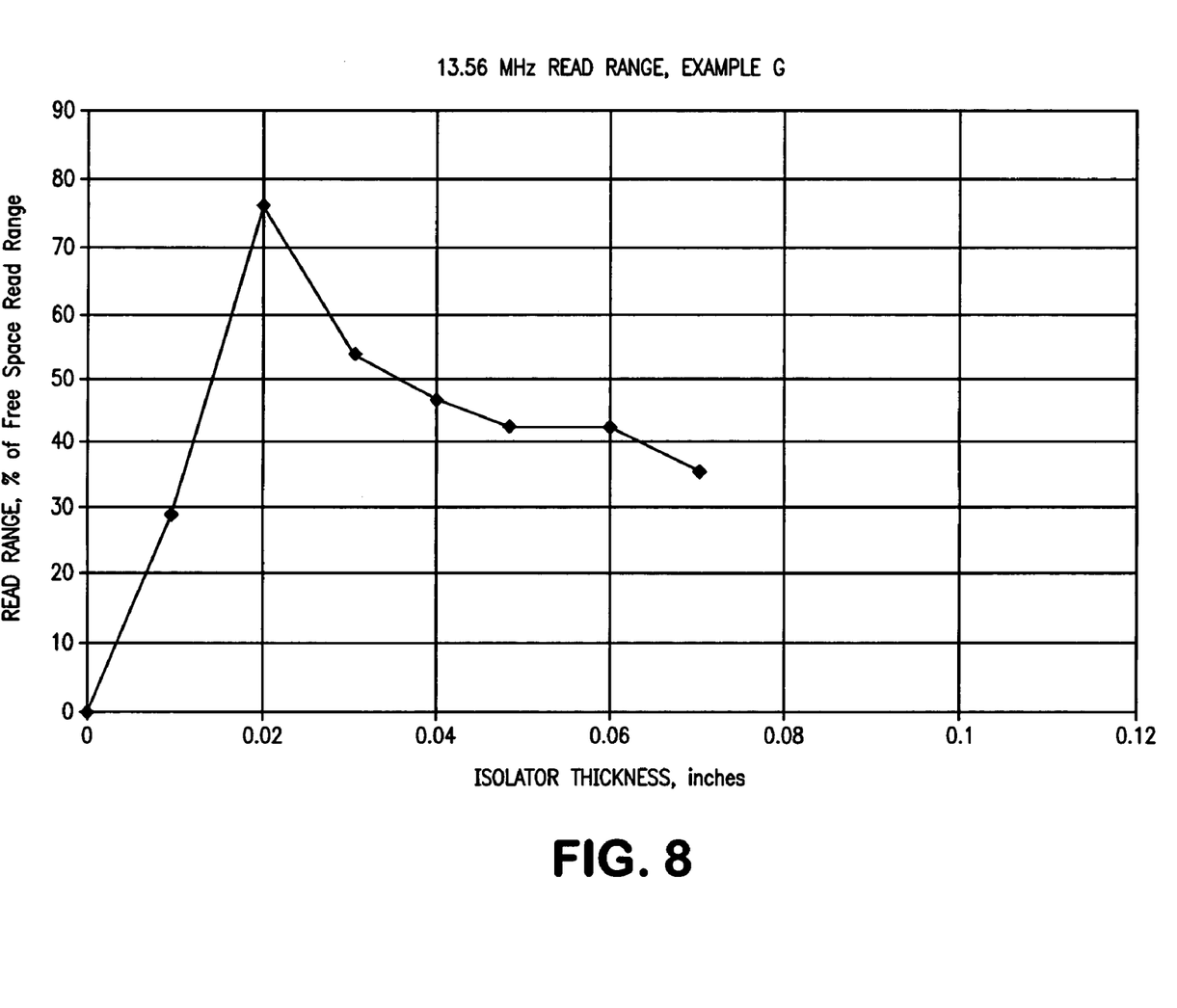
FIG. 8 illustrates a graphical representation of the read distance of an RFID tag in close proximity to a metal surface vs. material thickness for a composite containing Iron/Nickel Alloy.

For illustrative purposes, referring to FIG. 3, $t_{l50}$ is approximately 0.015 inches, while $t_{u50}$ is approximately 0.045 inches. The $t_{l50}$ and $t_{u50}$ values for the various composites are graphed on FIG. 11 and connected using a least squares estimation. This approximation yields the following equations:

$$\mu'^* t_{l50} = 170; \text{ and} \quad (4)$$

$$\mu'^* t_{u50} = 450 \quad (5)$$

where $t_{l50}$=minimum isolator thickness, in mils,
$t_{u50}$=maximum isolator thickness, in mils, and
$\mu'$=real part of complex relative permeability These approximations are represented by lines A and B, respectively. Thus, the operating range can be expressed as:

$$170 \leq \mu'^* t \leq 450 \quad (6)$$

It should be noted that these results and approximation were all made using the Tag-it™ ISO 15693 compatible RFID tag being interrogated with a RightTag, Inc Series 3000 RFID Hand Held Reader. It is expected that other combinations of RFID tags and readers would yield similar results, perhaps with variations in the constants in these equation.

Alternatively, while the above examples utilize a single ferromagnetic sheet located between the article and the RFID tag, the invention is not so limited. In one embodiment, a second layer is used to reduce the variability of read distance caused by the composition of the article. The same RFID tag may have differing read distances, based on the composition of article on which it is mounted. For example, results may vary based on whether the article is made of aluminum or steel. The use of a second layer consisting of a given metal provides a standard metal/isolator interface independent of article composition and can be beneficial in reducing this variability. In another embodiment, protective or decorative layers may be present on the article. In most cases such layers present no modification in the selection of isolator permeability/thickness. However if such layers would represent a significant thickness with respect to the isolator thickness, the selected isolator thickness would require adjustment such that the composite permeability of such layers plus isolator multiplied by the composite thickness satisfied the optimization equation. Therefore, the ferromagnetic isolator sheet may be used in conjunction with additional layers.

While the previous examples illustrated the use of tags affixed to a metal surface, in certain applications, such as RFID tagging of tools, machine parts, and fasteners, for example, it may desirous to embed the RFID chip/antenna system in the metal part. Typically, a small RFID chip with integral antenna is mounted in a cavity, or well, machined into the surface of the metal part to be identified. However, traditionally, chips affixed in this manner cannot be read. However, by interposing the appropriate thickness ferromagnetic isolator in the cavity between the chip and the metal, analogous to the previously described methods, the chip can be read.

By way of illustration, a 0.1-inch square by 0.020-inch thick RFID chip with integral antenna, when embedded in a well machined into metal using epoxy resin, cannot be read. An isolator composite material consisting of carbonyl iron blended into clear epoxy resin was fabricated. The permeability of this isolator material is approximately 6.4-0.2 i. In accordance with equation (6), an appropriate thickness range of an isolator material, having this permeability, interposed between the chip and the bottom of the metal well in which the chip will be mounted would be 0.027-0.070 inches. However, because the read range of such the extremely small chip/antenna system was small, circa 3 mm, equation (2), which is used to determine the optimal isolator thickness, indicated that a thickness of approximately 0.04 was most appropriate.

Figure 13:
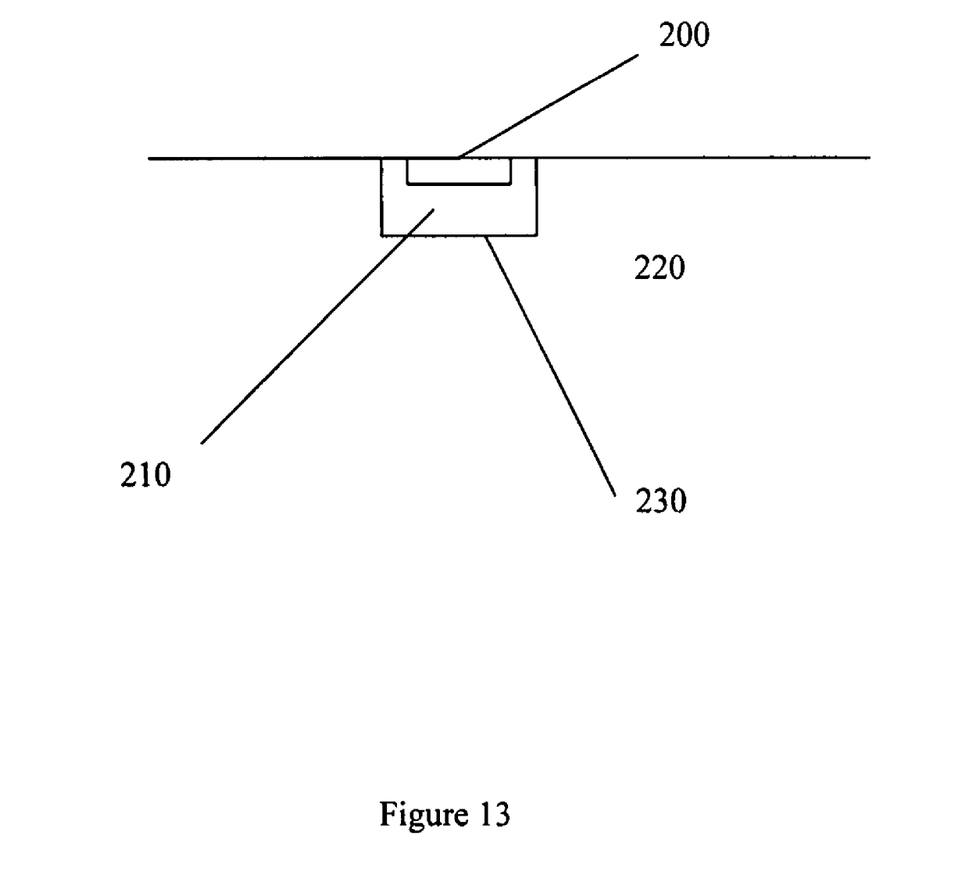
FIG. 13 shows a second embodiment of the present invention.

Accordingly, as shown in FIG. 13, a 0.225-inch diameter cylindrical isolator "plug" 210 was machined from the cured, rigid isolator material to fit into a well 230 of that size machined into metal 220. The plug 210 was machined to a thickness of 0.080 inches and a square well 0.04 inches deep was machined into the plug for seating the chip 200, thereby providing 0.04 inches of isolator material at the base of the chip. The chip was inserted into the well of the isolator 210 and covered with clear epoxy to fully encase the chip. This assembly was then inserted into the well 230 in the metal 220. As expected, the chip was readable.

This example is meant to be illustrative and is not intended to limit the use of embedded RFID tags to only specific isolator materials or thicknesses. Rather, this example demonstrates the concepts described previously are applicable to both RFID tags affixed to a metal surface and those embedded in a metal surface.

What is claimed:

1. An identification system, adapted to transmit identifying information about an article via radio frequency, comprising:
   an RFID tag, adapted to transmit said identifying information via radio frequency when energized; and a layer having first and second opposite surfaces, wherein said first surface is adapted to be in contact with said article, said second surface is in contact with said RFID tag; said layer having a thickness of less than 0.1 inches and a permeability of less than 10.

2. The system of claim 1, wherein said identification system utilizes radio frequency at 13.56 MHz.

3. The system of claim 1, wherein said layer comprises ferromagnetic material having a permeability greater than 1.

4. The system of claim 3, wherein said material is selected from the group consisting of Nickel/Zinc Ferrite, Manganese/Zinc Ferrite, Carbonyl Iron, Carbonyl Iron+Magnetite, Iron Silicide and Iron/Nickel Alloy.

5. The system of claim 3, wherein the optimal thickness of said layer of said ferromagnetic material, in mils, is equal to 240 divided by the permeability of said material.

6. The system of claim 1, wherein said article comprises a cavity, and said layer and RFID tag are embedded in said cavity.

7. The system of claim 1, wherein said article comprises metal.

8. The system of claim 1, wherein said article comprises liquid.

9. An identification system, adapted to transmit identifying information about an article via radio frequency, comprising:

an RFID tag, adapted to transmit said identifying information via radio frequency when energized; and a layer having first and second opposite surfaces, wherein said first surface is adapted to be in contact with said article, said second surface is in contact with said RFID tag; said layer comprising ferromagnetic material having a permeability greater than 1 and less than 10 and a thickness, wherein said thickness, in mils, multiplied by said permeability is between about 170 and 450.

10. The system of claim 9, wherein said ferromagnetic material is selected from the group consisting of Nickel/Zinc Ferrite, Manganese/Zinc Ferrite, Carbonyl Iron, Carbonyl Iron+Magnetite, Iron Suicide and Iron/Nickel Alloy.

11. The system of claim 9, wherein said article comprises a cavity, and said layer and RFID tag are embedded in said cavity.

12. The system of claim 9, wherein said identification system utilizes radio frequency at 13.56 MHz.

13. The system of claim 9, wherein said article comprises metal.

14. The system of claim 9, wherein said article comprises liquid.

15. An identification system, adapted to transmit identifying information about an article via radio frequency, comprising:

a substrate comprising an antenna and a silicon chip mounted thereon, adapted to transmit said identifying information via radio frequency when energized; and a layer having first and second opposite surfaces, wherein said first surface is adapted to be in contact with said article, said second surface is in contact with said substrate; said layer having a thickness of less than 1 inches and a permeability of less than 10.

16. The system of 15, wherein said identification system utilizes radio frequency at 13.56 MHz.

17. The system of claim 15, wherein said layer comprises ferromagnetic material having a permeability greater than 1.

18. The system of claim 17, wherein said material is selected from the group consisting of Nickel/Zinc Ferrite, Manganese/Zinc Ferrite, Carbonyl Iron, Carbonyl Iron+Magnetite, Iron Silicide and Iron/Nickel Alloy.

19. The system of claim 17, wherein the optimal thickness of said layer of said ferromagnetic material, in mils, is equal to 240 divided by the permeability of said material.

20. The system of claim 15, wherein said article comprises a cavity, and said layer and said substrate are embedded in said cavity.

21. The system of claim 15, wherein said article comprises metal.

22. The system of claim 15, wherein said article comprises liquid.

23. An identification system, adapted to transmit identifying information about an article via radio frequency, comprising:

a substrate comprising an antenna and a silicon chip mounted thereon, adapted to transmit said identifying information via radio frequency when energized; and a layer having first and second opposite surfaces, wherein said first surface is adapted to be in contact with said article, said second surface is in contact with said substrate; said layer comprising ferromagnetic material having a permeability greater than 1 and less than 10 and a thickness, wherein said thickness, in mils, multiplied by said permeability is between about 170 and 450.

24. The system of claim 23, wherein said identification system utilizes radio frequency at 13.56 MHz.

25. The system of claim 23, wherein said ferromagnetic material is selected from the group consisting of Nickel/Zinc Ferrite, Manganese/Zinc Ferrite, Carbonyl Iron, Carbonyl Iron+Magnetite, Iron Silicide and Iron/Nickel Alloy.

26. The system of claim 23, wherein said article comprises a cavity, and said layer and said substrate are embedded in said cavity.

27. The system of claim 23, wherein said article comprises metal.

28. The system of claim 23, wherein said article comprises liquid.

* * * * *